Sept. 24, 1963        F. S. BASTER        3,104,922

PISTON

Filed July 7, 1961        3 Sheets-Sheet 1

INVENTOR.
FOREST S. BASTER

BY Watts, Edgerton, Pyle & Fisher
ATTORNEYS.

INVENTOR.
FOREST S. BASTER
BY Watts, Edgerton, Pyle & Fisher
ATTORNEYS.

Sept. 24, 1963  F. S. BASTER  3,104,922
PISTON
Filed July 7, 1961  3 Sheets-Sheet 3

INVENTOR.
FOREST S. BASTER
BY
Watts, Edgerton, Pyle & Fisher
ATTORNEYS.

3,104,922
PISTON
Forest S. Baster, Beachwood, Ohio, assignor to The White
Motor Company, Cleveland, Ohio, a corporation of
Ohio
Filed July 7, 1961, Ser. No. 122,541
8 Claims. (Cl. 92—239)

This invention pertains to internal combustion engine pistons designed for use in high compression engines.

An ideally designed piston for an internal combustion engine should have uniform heat distribution and with it uniform expansion of the piston when a motor is brought to operating temperature. At the same time, it is essential that the piston provide strength and rigidity to withstand the substantial compression pressures of modern-day engines. Many proposals have been made for the obtainment of these two ideals but none have fully supplied them at least insofar as diesel and other high compression engines are concerned. The prior proposals have either sacrificed heat conductivity for strength or, conversely, strength for heat conductivity. Thus, previously proposed pistons capable of withstanding the pressures and temperature encountered in diesel and other high compression engines have not had good heat distribution. The result has been excessive heat concentration in the portion of the piston known as the ring belt. When the ring belt becomes overheated the result is excessive ring wear.

Inherently, since high compression engine pistons must have great strength, the heat distribution problem is magnified. Heat distribution has, in the past, been so poor that, for example, all diesel engine piston sidewalls, or skirts as they are known, have been contoured to compensate for expansion. Generally, this expansion compensation has been obtained with either tapered or concave skirts to prevent excessive expansions, especially in the central part of the piston, from scoring the surrounding cylinder walls. Many prior proposals which seek to alleviate the heat distribution problem and with it alleviate the complex and intricate shaping of piston skirts have not been adaptable to pistons for diesel engines and other engines of comparable compression because these heat distribution proposals tend to weaken the piston substantially.

With this invention, on the other hand, a piston is provided which, for the first time, has both the strength and the rigidity to withstand operation in a diesel engine and at the same time heat distribution characteristics which provide sufficiently uniform expansion to permit the piston skirt to be cylindrically contoured. The heat distribution characteristics also reduce ring wear to a level considered normal for other and lower compression engines.

Accordingly, the principal object of this invention is to provide a novel and improved piston which is sufficiently strong and rigid to serve as a diesel engine piston and which at the same time has sufficiently uniform heat distribution characteristics to provide substantially uniform piston expansion.

Another object of the invention is to provide a piston having a novel and improved heat distributing construction whereby to reduce the wear of the associated piston rings.

A more special object of the invention is to provide substantially uniform expansion in the piston region supporting the compression rings and in a lower region supporting stabilizing rings so that the piston expansion in the regions adjacent rings is substantially uniform.

This and other objectives are accomplished by providing a piston with a head, an attached ring belt, and a spaced skirt. The skirt is secured to the head by an annular web which is connected to the skirt near its base. The web is otherwise spaced from the skirt to provide an annular insulating space between the skirt and the web. At the same time the skirt and the web are both preferably integrally united to a piston rod supporting boss so that the requisite strength is obtained.

An additional object of the invention, then, is to provide a novel and improved piston which has an annular insulating space between an annular web and a surrounding skirt.

Other objects and a fuller understanding of the invention may be had by referring to the following description and claims taken in conjunction with the accompanying drawings, in which:

Figure 2:
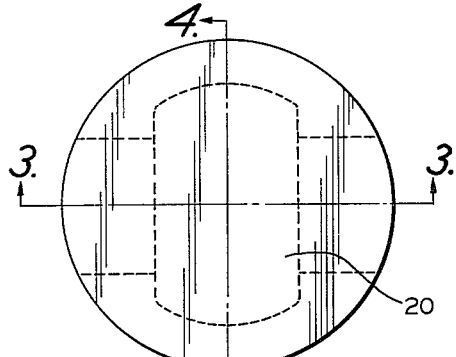
FIGURE 2 is a top plane view of the piston of FIGURE 1.
Figure 5:
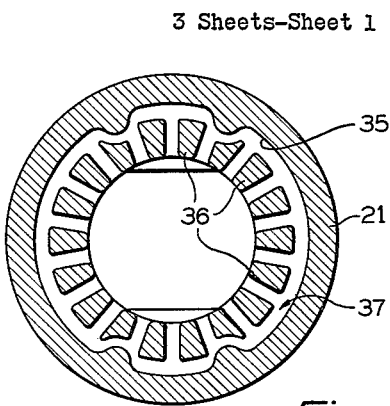
Figure 1:
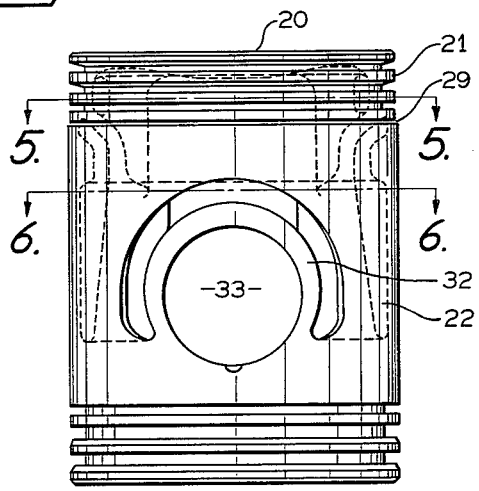
FIGURE 1 is a side elevational view of one of the new pistons.
Figure 6:
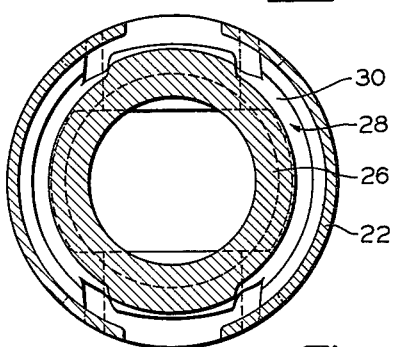
Figure 4:
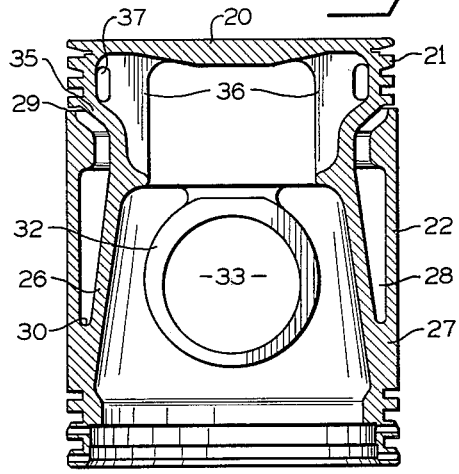
Figure 3:
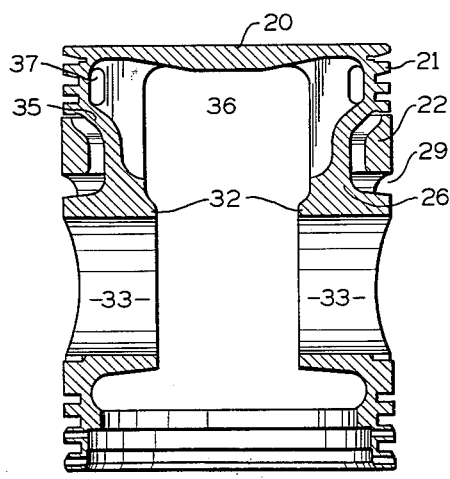
Figure 10:
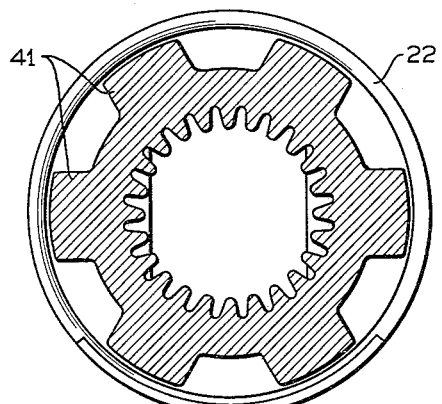
Figure 7:
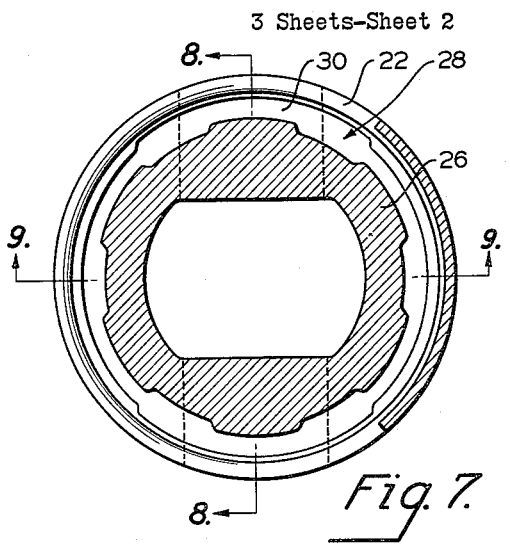
Figure 8:
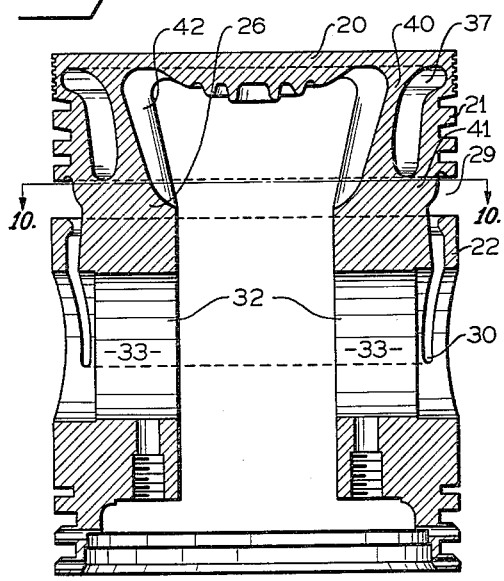
Figure 9:
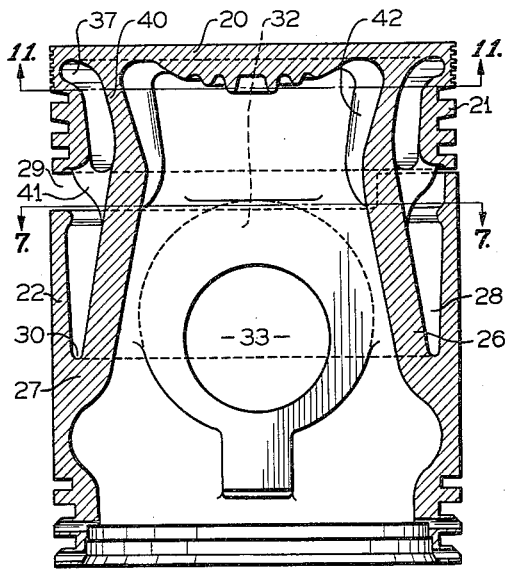
Figure 11:
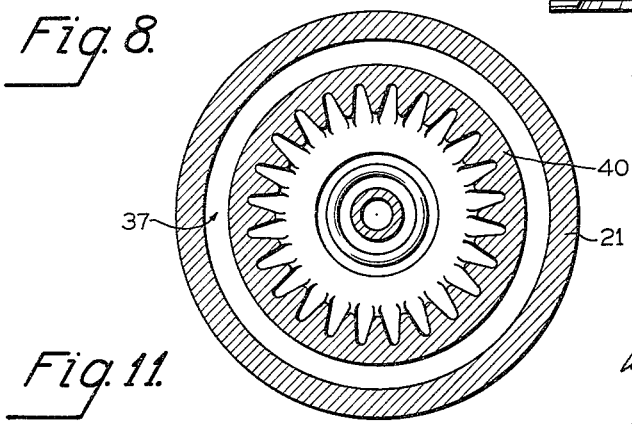
Figure 12:
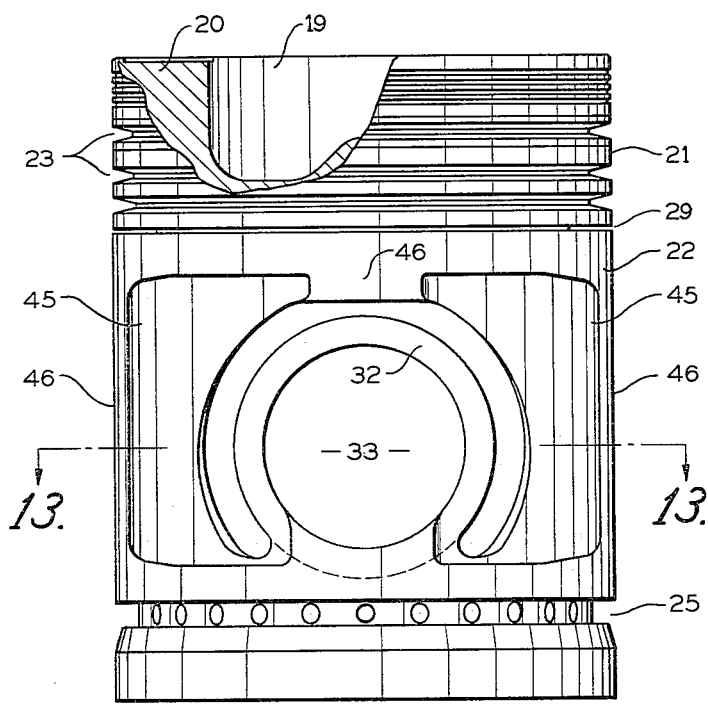

FIGURES 3 and 4 are sectional views of the piston as seen from the plane indicated by the lines 3—3 and 4—4 of FIGURE 2, respectively;

FIGURES 5 and 6 are sectional views as seen from the planes indicated respectively by the lines 5—5 and 6—6 of FIGURE 1;

FIGURE 7 is a sectional view of another piston as seen from the plane indicated by the line 7—7 of FIGURE 9;

FIGURES 8 and 9 are sectional views of the piston of FIGURE 7 as seen respectively from the planes indicated by the lines 8—8 and 9—9 of FIGURE 7;

FIGURE 10 is a sectional view of the piston of FIGURES 7–9 as seen from the plane indicated by the line 10—10 of FIGURE 8;

FIGURE 11 is a sectional view of the piston of FIGURES 7–10 as seen from the plane indicated by the line 11—11 of FIGURE 9;

FIGURE 12 is a side elevational view of a slightly modified piston; and

Figure 13:
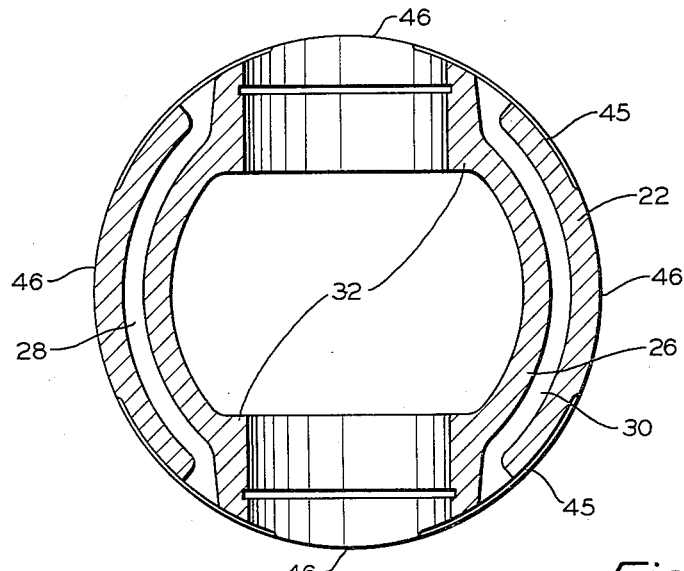

FIGURE 13 is a sectional view of the piston of FIGURE 12 as seen from the plane indicated by the line 13—13 of FIGURE 12.

The piston of the application is shown in similar forms in FIGURES 1–6, 7–11 and 12, 13 respectively. The constructions of FIGURES 1–6 and 7–11 differ only in the form of web-to-crown connection which will be discussed in detail below. The construction of FIGURES 12 and 13 differs only in that the periphery of the skirt is relieved. In all other respects, the ensuing description is equally applicable to both forms of the invention. In each case the piston is an integrally formed, one piece, unitary structure.

Referring now to the drawings, a piston is shown in each view, which piston includes a head 20. The head 20 is, in FIGURES 1–11 an imperforate disc with a planar upper or compression surface. In FIGURE 13 there is a compression chamber 19.

A ring belt 21 is provided. The ring belt 21 depends from the periphery of the head 20 and forms a part of the head. The belt 21 includes a plurality of ring grooves 23 for receiving the usual compression and, if desired, oil rings. The belt ring grooves 23 are each within the contour generated by the remainder of the belt. This contour is cylindrical.

A skirt 22 is provided which is also cylindrically contoured. The skirt 22 is, as is best seen by an examination of FIGURE 1, preferably slightly larger in diameter than the belt 21. This variance in diameter accommodates a difference in expansion while permitting both the belt and skirt to be formed in the shape of true cylinders for reasons which will be explained in greater detail below.

The skirt has, adjacent its lower end, a plurality of ring receiving grooves 25 for the usual oil rings. The skirt ring grooves 25 are, similar to the belt ring grooves 23, within the contour generated by the skirt.

The head 20 and the skirt 22 are connected together by an annular web 26. This web flares inwardly from a connection with the head and belt and thence downwardly and outwardly, in a generally frusto-conical shape, to a connection with the skirt 22. This connection of the skirt 22 to the annular web 26 is designated by the numeral 27, FIGURES 4 and 9. The connection 27 is an integral annular uniting of the two annular elements 22 and 26.

The space above this connection 27 between the web 26 and the lower skirt section 22 is an annular insulating space 28. This annular space extends from the periphery of the piston through a slot portion 29 between the belt and skirt 21, 22 downwardly to a termination 30 located by the connection 27 of the lower skirt section and web.

A boss composed of two sections, each identified by the numeral 32, is provided. The boss is a wrist pin boss having a through wrist pin bore 33 of cylindrical configuration. The wrist pin bore 33 has an axis which is normal to and intersects the vertical or longitudinal axis of the piston.

One of the outstanding advantages of the invention is obtained through the unique boss construction. The boss is directly united with both the web 26 and the skirt 22; but, nonetheless, the boss does not substantially interfere with the insulation provided by the annular insulating space 28. This annular insulating space extends, then, downwardly to the termination 30 which is between two imaginary planes which are each normal to the longitudinal piston axis. One of these planes is located by the axis of the wrist pin and the other is tangential to the lower portion of the boss. Except for its interruption by the boss, the termination 30 is at all circumferential points between these planes.

With the construction thus far described, all heat transmission to the skirt 22 is through the web 26. Because of the annular structure of the web 26, this heat is uniformly distributed circumferentially speaking. Additionally, because the connection between the web and the lower skirt section 22 is as low as possible, the heat transferred to the skirt does not cause the usual hot area and excessive expansion near the top of the skirt. At the same time adequate strength for a diesel or other high compression engine piston is maintained.

With this construction, then, uniform heat distribution is obtained and with it uniform piston expansion. Because of this uniform expansion, it is possible for the first time to make a high compression piston with cylindrical skirt which, when properly fitted, will not score in use. With a cylindrical skirt, any tendency of the piston to rock in a cylinder, especially when cold, is substantially, if not completely, eliminated.

The principal distinctions between the pistons of FIGURES 1–6 and FIGURES 7–11 reside in the connection of the web 26 to the head and belt. In the construction of FIGURES 1–6, there is an annular connection between the base of the belt 21 and the web designated by the numeral 35. The web 26 is connected to the head of the crown by a plurality of spaced ribs 36. These spaced ribs provide circulation passages to permit coolant to flow into and out of an annular insulating space 37 immediately behind or inside of the ring belt. This construction provides a communication of the spaces 28, 37 and an annular air space extending substantially from the head 20 to the termination 30. Cooling of the web 26 is enhanced by inwardly extending fins 42 in this construction.

In the embodiment of FIGURES 7–11, the connection between the web 26 and the head 20 is provided by an annular portion 40. The connection between the web and the base of the belt 21 is, on the other hand, provided by a plurality of spaced ribs 41.

Thus, in the embodiment of FIGURES 1–6, coolant communication between the insulating space 37 and the remainder of the interior piston is provided between the ribs 36, while in the embodiment of FIGURES 7–11 there is communication between the insulating spaces 38, 37 but both are separated from the interior of the piston by the annular web 26.

The piston of FIGURES 12 and 13 has a plurality of spaced reliefs 45. In the disclosed form there are four of these reliefs. The reliefs are provided to reduce the "oil shear." That is, they reduce the amount of oil wiped from a cylinder wall and therefore they improve the lubrication of rings carried by the ring belt. Even though these reliefs are present, the ability to prevent cocking or rocking described above is present. Thus, even though the skirt is not cylindrical, it is relieved in a manner which leaves circumferentially spaced cylindrical segments 46. Preferably, there will be at least one of these segments 46 on each side of the boss so that the tendency to rock is fully minimized.

While the invention has been described with a great deal of detail, it is believed that it essentially comprises a one-piece structure having a circular head with a depending annular ring belt and a depending web. The piston also has a skirt extending upwardly from a connection with the base of the web, in spaced relationship with the web. A piston rod boss is integrally connected to the web and preferably to the skirt as well. The space between the skirt and the web is an insulating space terminating below a plane located by the axis of the wrist pin bore and normal to the axis of the piston bore.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An internal combustion engine piston comprising;
 (a) a one piece integrally formed member having a head portion of circular configuration;
 (b) the head portion having a cylindrically contoured ring belt portion depending from the periphery thereof;
 (c) an annular heat distributing web part depending from the head portion and connected to both the belt portion and the head portion;
 (d) the connection of the web part to one of the mentioned portions being circumferential and integral and to the other being provided by a plurality of circumferentially spaced ribs;
 (e) a skirt portion having a contour defining segments of a cylinder and circumferentially connected near its base to the base of the web part for circumferentially uniform transmission of heat from the web part to the skirt portion;
 (f) said skirt portion extending upwardly from said web to skirt connection in spaced relationship with the web part and defining an annular insulating space therebetween;
 (g) said space having a lower circumferential termination defined by said web to skirt connection;
 (h) said belt portion and said skirt portion being spaced from one another;
 (i) each of the mentioned portions and the web part being in axial alignment along the axis of the piston;
 (j) a wrist pin boss portion defining a wrist pin receiving bore having an axis normal to and intersecting the piston axis; and
 (k) said boss portion being integrally united with said web.

2. An internal combustion engine piston comprising,
 (a) a one piece integrally formed member having a head portion of circular configuration;
 (b) the head portion having a cylindrically contoured ring belt portion depending from the periphery thereof;

(c) an annular heat distributing web portion depending from one of the previously mentioned portions;
(d) a skirt portion having a contour defining a plurality of circumferentially spaced segments of a cylinder and reliefs therebetween;
(e) the skirt portion being circumferentially connected near its base to the base of the web portion for circumferentially uniform transmission of heat from the web portion to the skirt portion;
(f) said skirt portion extending upwardly from said web to skirt connection in spaced relationship with the web portion and defining an annular insulating space therebetween;
(g) said space having a lower circumferential termination defined by said web to skirt connection;
(h) said belt portion and said skirt portion being spaced from one another;
(i) the head, belt, web and skirt portions being in axial alignment along the axis of the piston;
(j) a wrist pin boss portion defining a wrist pin receiving bore having an axis normal to and intersecting the piston axis, said boss portion being integrally united with said web portion; and,
(k) said skirt portion including an endless part between the belt and boss portions.

3. An internal combustion engine piston comprising,
(a) a one piece integrally formed member having a head portion of circular configuration;
(b) the head portion having a cylindrically contoured ring belt portion depending from the periphery thereof;
(c) an annular heat distributing web portion connected to and depending from the head portion and connected to and depending from the belt portion;
(d) a skirt portion connected near its base to the base of the web portion for transmission of heat from the web portion to the skirt portion;
(e) said skirt portion extending upwardly from said web to skirt connection in spaced relationship with the web portion and defining an annular insulating space therebetween;
(f) a wrist pin boss portion defining a wrist pin receiving bore; and,
(g) said boss portion being connected to said skirt and web portions.

4. An internal combustion engine piston comprising,
(a) a one piece integrally formed member having a head portion of circular configuration;
(b) the head portion having a cylindrically contoured ring belt portion depending from the periphery thereof;
(c) an annular heat distributing web portion depending from the head portion;
(d) an annular skirt portion having a contour defining segments of a cylinder circumferentially connected near its base to the base of the web portion for circumferentially uniform transmission of heat from the web portion to the skirt portion;
(e) said skirt portion extending upwardly from said web to skirt connection in spaced relationship with the web portion and defining an annular insulating space therebetween;
(f) said space having a lower circumferential termination defined by said web to skirt connection;
(g) said belt portion and said skirt portion being spaced from one another;
(h) each of the mentioned portions being in axial alignment along the axis of the piston;
(i) a wrist pin boss portion defining a wrist pin receiving bore having an axis normal to and intersecting the piston axis;
(j) said boss portion being directly and integrally united with said web portion and also being directly and integrally united with said skirt portion, said space termination other than in said boss portion being at all circumferential points below an imaginary plane including said wrist pin axis and normal to said piston axis; and,
(k) said skirt including an annular part between the boss and the belt portions.

5. A unitary one-piece piston comprising
(a) a disc-like head;
(b) a cylindrically contoured ring belt, the ring belt being connected to and depending from the head periphery and having a plurality of ring grooves formed within the cylindrical contour;
(c) a skirt in axial alignment with and spaced from the belt and having a contour defining segments of a cylinder;
(d) a wrist pin boss directly united to said skirt on opposite sides thereof and defining a through wrist pin bore having an axis normal to and intersecting the axis of the skirt;
(e) an annular web directly connected to the belt and at a location spaced from the head and said web also being connected to the skirt near the base of the latter;
(f) the web being spaced from the skirt between said web to skirt and web to ring belt connections to define an annular insulating space extending from said space between the ring belt and skirt to said web to skirt connection;
(g) said web being directly united to said boss between the planes of both of said web to skirt and said web to belt connections; and,
(h) both said skirt to boss connections and said web to skirt connections being entirely below and spaced from a plane normal to the skirt axis and including the bore axis.

6. The piston of claim 5 wherein said web includes a portion extending from the web to belt connection to the head and wherein said web portion is spaced from said belt to define annular insulating space therebetween.

7. A diesel engine piston comprising,
(a) an imperforate head element of circular configuration;
(b) the head element having a cylindrically contoured ring belt portion depending from the periphery thereof;
(c) a heat distributing web element depending from the head element;
(d) a skirt element being circumferentially connected near its base to the base of the web element for circumferentially uniform transmission of heat from the web element to the skirt element;
(e) said skirt element extending upwardly from said web to skirt connection in spaced relationship with the web and defining an annular insulating space by said web to skirt connection;
(f) said space having a lower termination defined by said web to skirt connection;
(g) said belt portion being of substantially equal but slightly smaller diameter than the skirt element, said belt portion and said skirt element being spaced from one another;
(h) each of the mentioned elements being in axial alignment along the piston axis;
(i) a wrist pin boss element defining a wrist pin receiving bore having an axis normal to and intersecting the piston axis;
(j) said boss element being directly united with both said web and skirt elements, said space termination being at all circumferential points below an imaginary plane including said wrist pin axis and normal to said mentioned element axis; and,
(k) said skirt including an annular part between the boss element and the belt portion.

8. A diesel engine piston comprising:
(a) an imperforate head element of circular configuration;

(b) the head element having a cylindrically contoured, ring belt portion depending from the periphery thereof;
(c) a heat distributing web element depending from the head element;
(d) a cylindrically contoured skirt element circumferentially connected near its base to the base of the web element for circumferentially uniform transmission of heat from the web element to the skirt element;
(e) said skirt element extending upwardly from said web to skirt connection in spaced relationship with the web and defining an annular insulating space therebetween;
(f) said space having a lower circumferential termination defined by said web to skirt connection;
(g) said belt portion being substantially equal but slightly smaller diameter than the skirt element;
(h) said belt portion and said skirt element being spaced from one another;
(i) each of the mentioned elements being in axial alignment along the piston axis;
(j) a wrist pin boss element defining a wrist pin receiving bore having an axis normal to and intersecting the piston axis, said boss element being directly united with both said web and skirt elements near both ends of the boss element;
(k) said space termination being at all circumferential points below an imaginary plane including said wrist pin axis and normal to said mentioned element axis;
(l) said space termination between said boss to skirt element being above a plane tangential to the lower side of the boss and normal to said mentioned element axis; and,
(m) said skirt including an annular part between the boss element and the belt portion.

References Cited in the file of this patent
UNITED STATES PATENTS 2,100,203    Schoengarth _____ Nov. 23, 1937

FOREIGN PATENTS 2,789    Great Britain _____ July 9, 1914
753,615    France _____ Aug. 12, 1933